(12) United States Patent
Dupré

(10) Patent No.: US 8,601,270 B2
(45) Date of Patent: Dec. 3, 2013

(54) METHOD FOR THE PREPARATION OF A CHIP CARD FOR ELECTRONIC SIGNATURE SERVICES

(75) Inventor: Michael Dupré, Sankt Augustin (DE)

(73) Assignee: T-Mobile International AG & Co. KG, Bonn (DE)

( * ) Notice: Subject to any disclaimer, the term of this patent is extended or adjusted under 35 U.S.C. 154(b) by 943 days.

(21) Appl. No.: 12/158,727

(22) PCT Filed: Dec. 8, 2006

(86) PCT No.: PCT/EP2006/011796
§ 371 (c)(1),
(2), (4) Date: Nov. 17, 2008

(87) PCT Pub. No.: WO2007/073842
PCT Pub. Date: Jul. 5, 2007

(65) Prior Publication Data
US 2009/0077382 A1    Mar. 19, 2009

(30) Foreign Application Priority Data

Dec. 24, 2005 (DE) .................. 10 2005 062 307

(51) Int. Cl.
*H04L 9/32* (2006.01)
*G06F 21/00* (2013.01)

(52) U.S. Cl.
USPC ........... 713/173; 713/156; 713/172; 713/183; 713/186

(58) Field of Classification Search
USPC ......... 713/156, 172, 183, 186, 155, 168, 173, 713/185; 726/5, 6, 2, 20
See application file for complete search history.

(56) References Cited

U.S. PATENT DOCUMENTS

| | | | | |
|---|---|---|---|---|
| 5,784,463 A | * | 7/1998 | Chen et al. | 713/171 |
| 5,943,423 A | * | 8/1999 | Muftic | 705/67 |
| 6,076,078 A | * | 6/2000 | Camp et al. | 705/65 |
| 6,263,446 B1 | * | 7/2001 | Kausik et al. | 726/5 |

(Continued)

FOREIGN PATENT DOCUMENTS

| | | |
|---|---|---|
| DE | 199 47 986 | 4/2001 |
| EP | 1 225 534 | 7/2002 |
| WO | 01/22373 | 3/2001 |
| WO | 03/013167 | 2/2003 |

OTHER PUBLICATIONS

Kai Hwang, "Wireless PKI and Distributed IDS for Securing Intranets and M-Commerce," IEEE Third International Conference on Parallel and Distributed Computing, Applications, and Technologies, Sep. 2002, [retrieved from Citeseer databse on Apr. 5, 2012].*

(Continued)

*Primary Examiner* — Saleh Najjar
*Assistant Examiner* — Oleg Korsak
(74) *Attorney, Agent, or Firm* — Faegre Baker Daniels LLP

(57) ABSTRACT

A method for preparing a chip card for electronic signature services. According to said method, data is exchanged between a chip card user and a signature portal, an asymmetric pair of keys and a signature PIN that is associated with the asymmetric pair of keys being generated on the chip card by means of a software application which can be executed on the chip card, and the chip card communicating the signature PIN to the user.

18 Claims, 1 Drawing Sheet

(56) References Cited

U.S. PATENT DOCUMENTS

| | | | |
|---|---|---|---|
| 6,438,550 B1* | 8/2002 | Doyle et al. | 726/2 |
| 6,460,138 B1* | 10/2002 | Morris | 713/184 |
| 7,024,226 B2* | 4/2006 | Sandberg et al. | 455/558 |
| 7,117,364 B1 | 10/2006 | Hepper et al. | |
| 7,155,416 B2* | 12/2006 | Shatford | 705/67 |
| 7,886,345 B2* | 2/2011 | Kaliski et al. | 726/6 |
| 2002/0023217 A1* | 2/2002 | Wheeler et al. | 713/171 |
| 2002/0042879 A1* | 4/2002 | Gould et al. | 713/176 |
| 2002/0129257 A1* | 9/2002 | Parmelee et al. | 713/180 |
| 2005/0039018 A1 | 2/2005 | Wittkotter | |

OTHER PUBLICATIONS

Heiko Rossnagel, "Mobile Qualified Electronic Signatures and Certification on Demand", Public Key Infrastructure Lecture Notes in Computer Science, 2004, vol. 3093/2004 [retrieved from SprigerLink database on Apr. 5, 2012 "http://www.springerlink.com/content/h2r2lwl8gxb6bb22/"].*

Wireless Application Protocol [WAP-260-WIM-20010712-a Version Jul. 12, 2001].*

* cited by examiner

METHOD FOR THE PREPARATION OF A CHIP CARD FOR ELECTRONIC SIGNATURE SERVICES

CROSS-REFERENCE TO RELATED APPLICATION

This application is related to and claims the benefit under 35 U.S.C. §119 and 35 U.S.C. §365 of International Application No. PCT/EP2006/011796, filed Dec. 9, 2006.

BACKGROUND

The invention relates to a method for the preparation of a chip card for electronic signature services. In particular the invention relates to the preparation of subscriber identification cards, so-called SIM cards, for electronic signature services via mobile communications.

In the case of an electronic signature it is a matter of electronic data which are supposed to ensure the authenticity and integrity of electronic information, usually electronic documents. In addition an electronic signature is supposed to guarantee the identity of the person signing. These features in turn should be verifiable with the help of the electronic signature. With these properties the electronic signature should constitute the electronic equivalent of the genuine signature. These strived for properties of the electronic signature are achieved depending on the applied signature technology, existing usage scenario, as well as the given legal situation.

An electronic signature is usually based on asymmetric encryption methods. The known public key of a signer allows the verification of his signature, which was generated with his private key. In contrast to qualified signatures however in the case of advanced signatures, private and public keys do not have to be associated to the signature creator. Hence while the authenticity and integrity of the signed data can be verified, however an identification of the signer via a certificate is not possible. In this case for example biometric methods, such as e.g. the genuine signature, which is recorded during the signing and embedded in the document in an encoded manner, can contribute to identification.

For the purpose of backing up the biometric data said data are additionally included in the hash value (checksum). In the case of signature verification then along with the signed data also the authenticity and integrity of the identification feature is checked.

For the identification of the signer and release of the signature service for example a PIN (personal identification number) is used. This PIN is up to now generated by a service provider, uniquely associated to a user (personalized) and communicated to the user together with the signature key via a communication route, for example by letter. In the case of this method the danger exists that a third party can misuse the data discovering the signature data and the PIN and can then pass as the signer. Additionally, as a rule an expenditure that is not inconsiderable is generated by the generation of the PIN.

SUMMARY

The object of the invention therefore lies in proposing a method for the preparation of a chip card for electronic signature services which is easy to realize and offers a good security against attacks.

This object is achieved by a method with the features of Claim 1.

In accordance with the invention a method is proposed in which information is exchanged between a user of the chip card and a signature portal, and an asymmetric pair of keys and a signature PIN associated to the asymmetric pair of keys is immediately generated on the chip card by means of a software application which can be executed on the chip card.

Hence an easy method is provided for preparing a chip card application for signature services. The chip card application internally generates an asymmetric pair of keys, thus one public and one private key, and a signature PIN and sends the public key to a signature portal securely for registration. A user identification, for example a cellular number, and a so-called token, for example a random number, are used in order to identify and authenticate the user vis-à-vis the signature portal or the chip card. The method in accordance with the invention is characterized among other things by the fact that the signature PIN is generated within the chip card and subsequently displayed to the user.

An expensive personalization and communication of the PIN is omitted.

no special terminal is required for the carrying out of the method: any SIM application toolkit-capable mobile phone is sufficient.

The signature portal is subsequently able to have transactions signed by the chip card. A certificate is not necessarily required.

The advantage of the invention consists in that a previously carried out and relatively expensive personalization of a signature PIN in the signature portal and a communication to the user are omitted. Since the generation of the signature PIN by a further party and a communication of the signature PIN are omitted, the risk of the discovery and misuse of the data is also reduced. A further advantage lies in the fact that the signature PIN is predefined for the user by the chip card and therefore automatically a signature PIN that is as "secure/random" as possible is selected.

Advantageous embodiments and preferred improvements of the invention are cited in the dependent claims.

BRIEF DESCRIPTION OF THE DRAWINGS

With the help of FIG. 1 a simplified sequence of the method in accordance with the invention is more closely explained.

DETAILED DESCRIPTION

Figure 1:
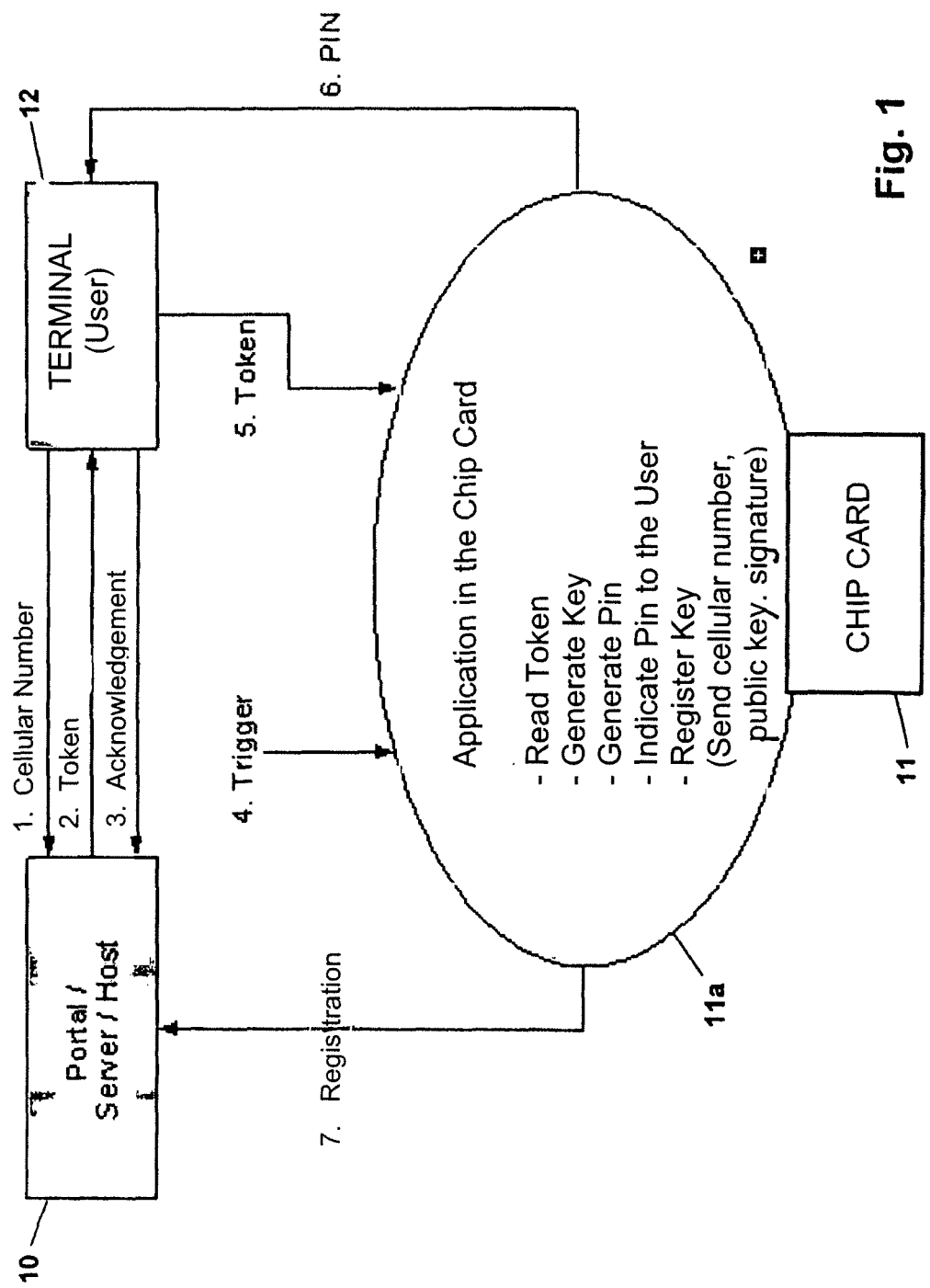

In accordance with the invention a signature portal 10 is set up which coordinates the carrying out of signature services and registers and administers those users who want to make use of electronic signature services. A user who would like to make use of signature services requires an electronic chip card 11, upon which a corresponding software application is installed for the preparation and carrying out of signature services. For input and output of data to or from the chip card 11 a terminal 12 is necessary, said terminal being able to read out data from the chip card and write data to the chip card and having corresponding input and output devices for the data at its disposal, such as e.g. a keyboard and a display panel. Further corresponding communication means are necessary, via which the terminal 12 and the chip card 11 operated with the terminal can communicate with the signature server 10. In advantageous manner a modern mobile phone can be used as a terminal 12, since it has corresponding input and output units and relatively powerful data processing equipment at its disposal. Further the mobile phone can be used instantaneously as a means of communication for the establishment of a communication link between the chip card 11 and the signature portal 10. However, a personal computer can also for example serve as a terminal, said person computer being connected for example via the Internet to the signature portal. In the subsequent example the use of a mobile telephone as a terminal is described. It is assumed that the user is simultaneously the subscriber of a cellular network in which the terminal can register.

Step 1:

The user, who is already known to the signature portal, establishes a connection to the signature portal 10 via his terminal 12 by registering there by means of a user identification. Depending on the user identification that is used, said identification is entered by the user if it cannot be automatically detected by the signature portal. For example, the cellular number of the user can be used as a user identification, said cellular number being automatically transmitted to the signature portal (CLIP function). As soon as the user has established a connection to the signature portal 10 he activates a function in the signature portal 10 for the generation of a new pair of keys on the chip card 11.

Step 2:

The signature portal 10 thereupon generates a token, e.g. a long number in the form of a random number, and stores it in a corresponding data record associated with the user. The token is sent to the user on separate routes, e.g. by letter.

Step 3:

The user acknowledges the receipt of the token, for example with his signature.

Step 4:

A corresponding software application 11a is installed on the chip card 11, said software application now being able to be started by the user. The user can e.g. do this himself after he has received a brief message (SMS) from the signature portal (trigger), or it can take place automatically by an OTA-SMS.

Step 5:

The software application 11a asks the user for the token sent to him, e.g. with the proactive UICC command "GET INPUT". The user inputs the token via the keyboard of the terminal 12. The software application 11a internally generates a new asymmetric pair of keys. A pair of keys if applicable already present will be deleted, e.g. if the user would like to renew the pair of keys or a signature PIN connected to the keys.

Step 6:

Using the token, the software application 11a generates a signature PIN and outputs the PIN to the user on the display of the terminal 12, e.g. with the proactive UICC command "DISPLAY TEXT". This makes it possible that the signature PIN is only known to the user outside the chip card 11 and yet is randomly selected.

Step 7:

The software application 11a registers the public key in the signature portal 10. For this purpose it generates a signature with the newly generated private key via a data structure which contains at least the public key and the token, as well as a user identification if applicable. The signature and the public key as well as, if applicable, the user identification are sent by the software application 11a to the signature portal 10. The communication can for example take place via SMS of the cellular network. If the data is sent by SMS, the cellular number can be used as the user identification, so that said identification will be automatically communicated in the case of the SMS dispatch to the recipient (here: the signature portal).

Hence the signature portal 10 can uniquely associate the SMS with the user.

The signature portal 10, which has generated the token and therefore knows, verifies the signature and with it authenticates the user. The signature serves as evidence to the signature portal 10 that the user possesses the associated private key.

The signature via the data structure, which contains the token, authenticates the user vis-à-vis the signature portal. An attack is all the more difficult the longer the character sequence of the token is. Additionally the signature portal could have a fingerprint of the user displayed via the public key, which the software application 11a on the chip card 11 can calculate and display and verify. The user himself must, if applicable, confirm vis-à-vis the signature portal 10.

If the user has forgotten his signature PIN, he can start the described procedure for the generation of a new pair of keys and an associated signature PIN at any time. In this case the existing pair of keys in the signature portal must be deleted. The chip card application likewise deletes the existing pair of keys and regenerates both the key as well as the PIN.

The invention claimed is:

1. A method for the preparation of a chip card for electronic signature services, in which case information is exchanged between a user of the chip card and a signature portal, comprising:

associating an asymmetric pair of keys and a signature PIN wherein the asymmetric pair of keys is immediately generated on the chip card by an executable software application on the chip card and the chip card communicates the signature PIN to the user; wherein the user and the user's public key are authenticated by the signature portal with the help of a signature generated by the software application;

registering by the software application on the chip card the public key in the signature portal by generating the signature with the private key via a data structure which contains at least the public key, the token and a user identification;

sending the signature, the public key and the user identification by the software application to the signature portal by using SMS cellular communication, wherein the cellular number is used as the user identification;

uniquely associating the SMS with the user in the signature portal;

verifying the signature by the signature portal by means of the token and using the signature as evidence to the signature portal that the user possesses the associated private key; and authenticating the user vis-à-vis the signature portal by the signature via the data structure, which contains the token.

2. A method for the preparation of a chip card for electronic signature services, in which case information is exchanged between a user of the chip card and a signature portal, comprising:

associating an asymmetric pair of keys and a signature PIN wherein the asymmetric pair of keys is immediately generated on the chip card by an executable software application on the chip card and the chip card communicates the signature PIN to the user;

registering the user with the signature portal;

generating a token associated with the user by the signature portal, saving the token in the signature portal and transmitting the token to the user;

generating the asymmetric pair of keys, consisting of one public key and one private key, by the executable software application on the chip card and using the token;

generating the signature PIN associated with the asymmetric pair of keys and communicating the signature PIN to the user;

registering by the software application on the chip card the public key in the signature portal by generating a signature with the private key via a data structure which contains at least the public key, the token and a user identification;

sending the signature, the public key and the user identification by the software application to the signature portal by using SMS cellular communication, wherein the cellular number is used as the user identification;

uniquely associating the SMS with the user in the signature portal;

verifying the signature by the signature portal by means of the token and using the signature as evidence to the signature portal that the user possesses the associated private key; and authenticating the user vis-à-vis the signature portal by the signature via the data structure, which contains the token.

3. The method according to claim 2, wherein the signature PIN is generated without the involvement or influence of the user.

4. The method according to claim 2, wherein the signature contains the token and optionally additional data for the identification of the user, wherein the token and the additional data have been encoded with the private key of the user.

5. The method according to claim 2, wherein the token is transmitted from the signature portal to the user on a non-electronic route.

6. The method according to claim 2, wherein a random number generated by the signature portal is used as a token that is transmitted to the user.

7. The method according to claim 2, wherein a terminal is used for communication between the chip card and the user.

8. The method according to claim 2, wherein a terminal compatible with a mobile communications system is used for communication between the chip card and the signature portal.

9. The method according to claim 8, wherein the terminal is used as a data input device, data output device and as a communications device for data exchange between the chip card and the signature portal.

10. The method according to claim 8, wherein the terminal is a mobile telephone.

11. A non-transitory computer-readable medium on which is stored a software application with a program code which, executed on a chip card, carries out a method according to claim 2.

12. A non-transitory computer-readable medium on which is stored a data processing program which comprises a software application which can be executed on a chip card for carrying out the method according to claim 2.

13. The method according to claim 3, wherein the signature PIN is generated without the involvement or influence of the user.

14. The method according to claim 2, wherein the signature contains the token and optionally additional data for the identification of the user, wherein the token and the additional data have been encoded with the private key of the user.

15. The method according to claim 3, wherein the signature contains the token and optionally additional data for the identification of the user, wherein the token and the additional data have been encoded with the private key of the user.

16. The method according to claim 3, wherein the token is transmitted from the signature portal to the user on a non-electronic route.

17. The method according to claim 4, wherein the token is transmitted from the signature portal to the user on a non-electronic route.

18. The method according to claim 2, wherein the user and the user's public key are authenticated by the signature portal with the help of the signature.

* * * * *